US010972208B2

(12) United States Patent
Frantz et al.

(10) Patent No.: US 10,972,208 B2
(45) Date of Patent: Apr. 6, 2021

(54) METHOD AND TOOL FOR SERVICE PROVISIONING WITH IMPROVED SPECTRAL EFFICIENCY IN GRID-LESS OPTICAL NETWORKS

(71) Applicant: Xieon Networks S.a.r.l., Luxembourg (LU)

(72) Inventors: Michael Frantz, Bad Aibling (DE); Juraj Slovak, Munich (DE); Heiko Riemer, Lisbon (PT)

(73) Assignee: XIEON NETWORKS S.A.R.L., Luxembourg (LU)

( * ) Notice: Subject to any disclaimer, the term of this patent is extended or adjusted under 35 U.S.C. 154(b) by 0 days.

(21) Appl. No.: 16/482,235

(22) PCT Filed: Dec. 5, 2017

(86) PCT No.: PCT/EP2017/081554
§ 371 (c)(1),
(2) Date: Jul. 30, 2019

(87) PCT Pub. No.: WO2018/137818
PCT Pub. Date: Aug. 2, 2018

(65) Prior Publication Data
US 2019/0349114 A1    Nov. 14, 2019

(30) Foreign Application Priority Data

Jan. 30, 2017  (EP) .................................... 17153753

(51) Int. Cl.
*H04J 14/00*  (2006.01)
*H04J 14/02*  (2006.01)
*H04Q 11/00*  (2006.01)

(52) U.S. Cl.
CPC ........... *H04J 14/0257* (2013.01); *H04J 14/00* (2013.01); *H04J 14/0278* (2013.01); *H04Q 11/00* (2013.01); *H04Q 11/0062* (2013.01)

(58) Field of Classification Search
CPC .... H04J 14/0257; H04J 14/0278; H04J 14/00; H04Q 11/0062; H04Q 11/00
(Continued)

(56) References Cited

U.S. PATENT DOCUMENTS 8,515,280 B1    8/2013  Li et al.
8,649,295 B2 *  2/2014  Matsuura ................ H04L 45/12
                                                  370/254
(Continued)

OTHER PUBLICATIONS

Xie et al, Survivable Virtual Optical Network Mapping in Flexible Grid Optical Networks, Apr. 2014, IEEE, All Document. (Year: 2014).*
(Continued)

*Primary Examiner* — Dibson J Sanchez (57) ABSTRACT

Disclosed is a service provisioning tool and method for determining favorable implementations of a service in a grid-less optical network, wherein said service provisioning tool is configured to assign total cost values to a given implementations, select the implementation or a group of implementations having the lowest cost, wherein said total cost values are based on —cost values regarding selectable data rates on individual links, —cost values regarding necessity to install additional equipment, —cost values regarding selectable signal frequency bands. One or more of said cost values are dynamically changing as a function of one or more of the degree of utilization, the lifetime of the service, the time available for establishing the service, a modulation format and a signal power. The cost value per band width varies, depending on one or more of the size of the selected frequency band, and to what extent the selected frequency (Continued)

band fills gaps between occupied spectral ranges or creates gaps remaining between occupied spectral ranges.

22 Claims, 6 Drawing Sheets

(58) Field of Classification Search
USPC .................................................. 398/43–103
See application file for complete search history.

(56) References Cited

U.S. PATENT DOCUMENTS

| | | | | |
|---|---|---|---|---|
| 9,160,477 | B2* | 10/2015 | Patel | H04J 14/021 |
| 9,215,030 | B2* | 12/2015 | Zami | H04J 14/02 |
| 10,348,439 | B1* | 7/2019 | Kim | H04L 43/0876 |
| 10,516,482 | B1* | 12/2019 | Schmogrow | H04J 14/0269 |
| 2003/0020977 | A1* | 1/2003 | Smith | H04J 14/0269 398/5 |
| 2004/0220886 | A1 | 11/2004 | Kumaran et al. | |
| 2006/0002716 | A1* | 1/2006 | Guy | H04J 14/0241 398/175 |
| 2009/0162075 | A1* | 6/2009 | Naito | H04Q 11/0062 398/182 |
| 2010/0014859 | A1* | 1/2010 | D'Alessandro | H04J 14/0246 398/48 |
| 2010/0040365 | A1* | 2/2010 | Kit Leung | H04J 14/0283 398/26 |
| 2012/0321297 | A1* | 12/2012 | Bottari | H04L 45/62 398/26 |
| 2013/0089323 | A1* | 4/2013 | Patel | H04B 10/0793 398/27 |
| 2013/0236169 | A1* | 9/2013 | Gaudette | H04B 10/0795 398/25 |
| 2013/0315580 | A1* | 11/2013 | Boertjes | H04Q 11/0005 398/5 |
| 2014/0099119 | A1* | 4/2014 | Wei | H04J 14/0227 398/79 |
| 2014/0334817 | A1* | 11/2014 | Miedema | H04Q 11/0005 398/48 |
| 2014/0376915 | A1* | 12/2014 | Rival | H04B 10/27 398/58 |
| 2015/0222386 | A1* | 8/2015 | Patel | H04J 14/0224 398/48 |
| 2015/0333864 | A1* | 11/2015 | Swinkels | H04B 10/0795 398/79 |
| 2016/0234578 | A1* | 8/2016 | Sareen | H04L 45/124 |
| 2017/0047999 | A1* | 2/2017 | Wei | H04L 41/12 |
| 2017/0142505 | A1* | 5/2017 | Maamoun | H04J 14/0224 |
| 2017/0331580 | A1* | 11/2017 | Shen | H04J 14/0227 |
| 2018/0006757 | A1* | 1/2018 | Prakash | H04J 14/0272 |
| 2018/0102865 | A1* | 4/2018 | Li | H04J 14/0212 |

OTHER PUBLICATIONS

Khandaker et al, Survivable Virtual Optical Network Mapping in Spectrum and Modulation Format, Jun. 2015, IEEE, All Document. (Year: 2015).*

Xie et al, Cost Optimized Design of Flexible Grid Optical Networks Considering Regenerator, Jun. 2014, IEEE, All Document. (Year: 2014).*

Eira Antonio et al, "Multi-objective design of survivable flexible-grid DWDM networks," Journal of Optical Communications and Networking, Institute of Electrical and Electronics Engineers, US, vol. 6, No. 3, Mar. 1, 2014 (Mar. 1, 2014) XP011544547, ISSN: 1943-0620, DOI:10.1364/JOCN.6.000326.

International Search Report and Written Opinion for Application No. PCT/EP2017/081554, 14 pages, dated Feb. 20, 2018 (Feb. 20, 2018).

Office Action issued by the China National Intellectual Property Administration (also known as the Chinese Patent Office), dated Jul. 20, 2020 (Feb. 20, 2018), for Chinese counterpart Application No. 201780085005.0 to PCT Application No. PCT/EP2017/081554, 20 pages (including cited reference Xie et al., Survivable Impairment-Constrained Virtual Optical Network Mapping in Flexible-Grid Optical Networks, J. Opt. Netw., vol. 6, No. 11, Nov. 2014).

Xie et al., Survivable Impairment-Constrained Virtual Optical Network Mapping in Flexible-Grid Optical Networks, J. Opt. Netw., vol. 6, No. 11, Nov. 2014.

* cited by examiner

METHOD AND TOOL FOR SERVICE PROVISIONING WITH IMPROVED SPECTRAL EFFICIENCY IN GRID-LESS OPTICAL NETWORKS

CROSS REFERENCE TO RELATED APPLICATIONS

This application is a U.S. National Phase Application under 35 U.S.C. § 371 of International Application No. PCT/EP2017/081554, filed on Dec. 5, 2017, which in turn claims priority to European Patent Application No. 17153753.3, filed on Jan. 30, 2017, both of which are incorporated herein by reference in their entireties.

FIELD OF THE INVENTION

The present invention is in the field of optical network management and operation. More particularly, the present invention relates to a method and tool for service provisioning with improved spectral efficiency in grid-less optical networks.

BACKGROUND OF THE INVENTION

Figure 1:
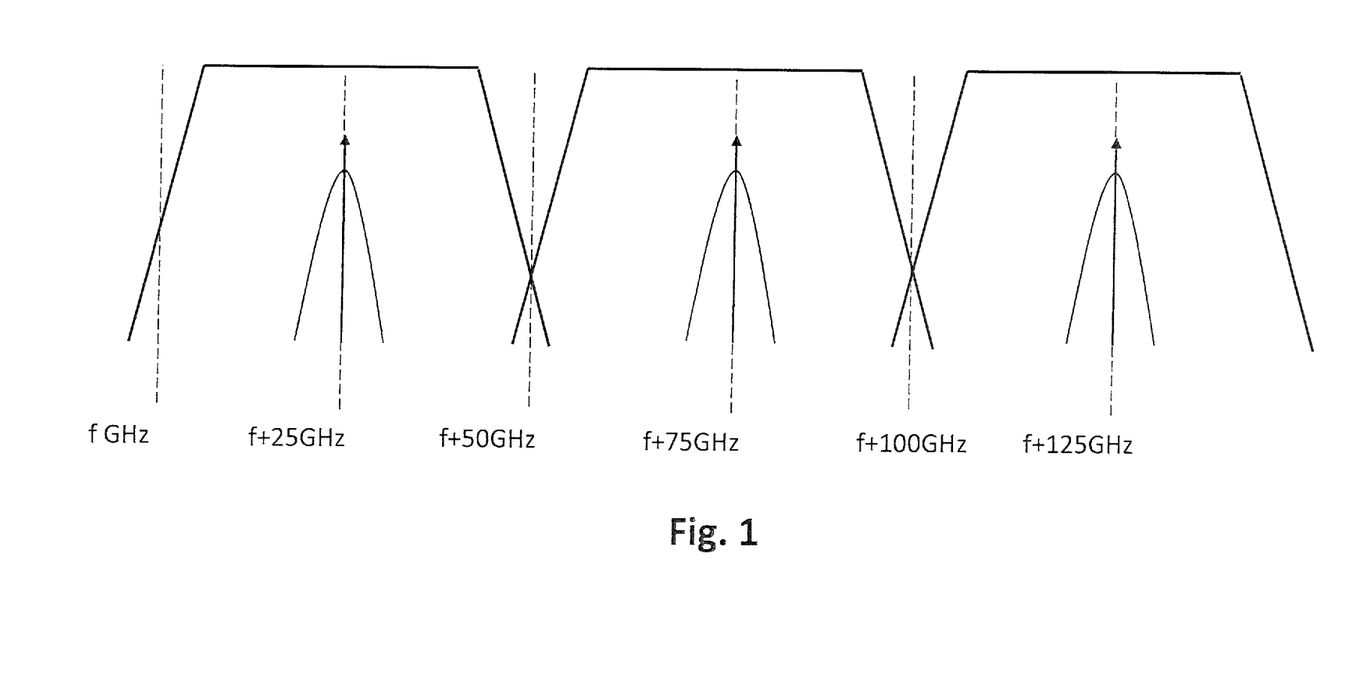

In legacy 50 GHz fixed-grid dense wavelength division multiplex (DWDM) networks, all optical signals are allocated and transported in frequency slots having a width of 50 GHz periodically spaced next to each other in a grid-like manner, as is shown in FIG. 1. Since the frequency slots are fixed, the corresponding network is sometimes referred to as "fixed-grid network" in the art.

Figure 2:
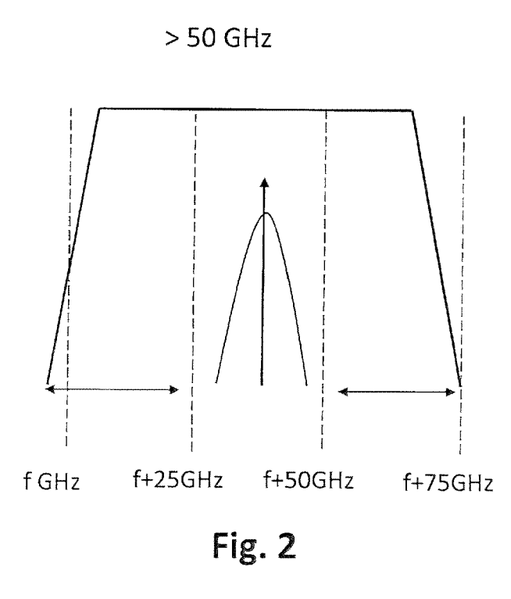
FIG. 2 shows a carrier in a frequency slot exceeding 50 GHz to thereby provide enlarged guard bands, together with the passband of a corresponding filter.

In addition to the frequency slots and carriers, in FIG. 1 the pass bands of corresponding filters used for the wavelength selective switching of the channels is shown. Due to a limited steepness of the flanks of optical filters, a signal that is spectrally close to the filter flank experiences considerable attenuation and disturbance. This effect adds up if a plurality of filters are successively passed, as is generally the case for optical signals transmitted in an optical network. As a result, the effective 3 dB bandwidth for example typically reduces to 30 GHz after a cascade of about 15 filters provided by wavelength selective switches (WSS). Accordingly, not the full width of the frequency slot is available for the optical signals, so that the carrier frequencies must be spectrally separated from the filter flanks by a certain amount or "safety margin", which is referred to as a "guard-band" in the art. In practice, the reach of the optical signals can be significantly affected by penalties due to optical filtering, the degree of such penalties depending on the baud rate of the optical signal (for a given filter band width), filter shape and the number of cascaded filters in the light path. For the state of the art modulation formats (100G QPSK, 150G 8QAM, 200G 16QAM) and a Baud rate of more than 34 Gbaud/s (with a 25% forward error correction (FEC)), the available bandwidth in view of the filter effects is smaller than the actual band width of the optical signals, such that components from both spectral edges of the signal are cut off, leading to a significant degradation of the optical signal upon transmission. Of course, one way of decreasing filter penalties would be to enlarge the guard bands associated with a channel, as is schematically shown in FIG. 2. However, this is only possible at the expense of decreasing the spectral efficiency, and hence sacrificing transmission capacity of the network.

Recent growth in dynamic and bandwidth intense user-applications, cloud services, etc. has invoked high interest in so-called "flex-grid optical networks" or "flex-networks", which is also referred to as "flexible DWDM grids". In the flexible DWDM grid optical networks, channel bandwidth and spectral grid allocation can be freely chosen within some granularity.

A network providing this possibility to selectively choose channel bandwidths and spectral location of a channel is referred to as a "grid-less optical network" in the present disclosure, of which the "flex-grid optical network" or "flexible DWDM grid" is an example. The technology of flex-grid WSSs (ITU-T recommendation G.694.1) allows for adjustment of the bandwidth at fine granularity (typically below 6.25 GHz) without introducing any amplitude dips in the spectrum of the frequency slot. As the frequency of a carrier can be freely positioned within the frequency slot, exact bandwidth adjustment optimized for the optical channel requirements becomes technically feasible. However, flex-grid networks are not only flexible with regard to the spectral location and bandwidth of channels, but also with regard to modulation formats, data rates and symbol rates. Flex-grid networks allow for simultaneous transmission of mixed bit rates, e.g. 100 Gb/s, 200 Gb/s, 400 Gb/s, 1 Tb/s, etc, and mixed modulation formats. Accordingly, in flex-grid networks, switchable transponders addressing the best possible combination of data rate, spectral efficiency, etc. can increase the efficiency and hence enable significant cost advantages to the network.

Figure 3:
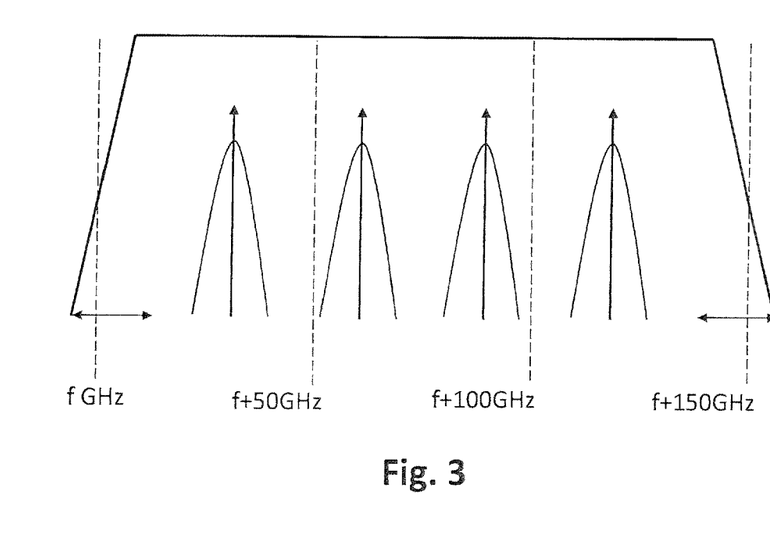
FIG. 3 is a schematic representation of a media channel including four densely packed carriers in a predetermined frequency range, together with the passband of a corresponding filter.

Importantly, the flex-grid concept in optical networks provides ways for ameliorating limitations due to optical filtering by densely packing two or more carriers in a single reserved wavelength range or "frequency slot" (FS). Although this frequency slot includes a plurality of carriers, it is treated by the network as a single channel, meaning that all the carriers within this frequency slot are commonly switched at each network node passed under way. Accordingly, this frequency slot is also referred to as "media channel" in the art. An example of a media channel including four carriers is shown in FIG. 3, together with the filter passband of a filter used to switch this media channel. The advantage of this approach is readily apparent from FIG. 3: Since guard bands only needed for the outermost carriers ("edge carriers"), but not in between adjacent carriers, the carriers can be packed closer to each other as compared to the arrangement of FIG. 1, with the minimum spacing being generally limited by inter-carrier crosstalk.

The limitation of the use of media channels is that all carriers of the same FS or media channel have to be added (Tx site) and dropped (Rx site) in the same node and have to be transmitted over the same optical path. In practical applications, one has to find a compromise between improved transmission characteristics and/or increased spectral efficiency on the one hand and the routing granularity on the other hand. Thus, in practical applications, both, multi-carrier configurations such as media channels and single-carrier scenarios will coexist in the same network.

The multitude of options provided by flex-grid networks with regard to spectral distribution of channels as well as choice of data rates, symbol rate and modulation formats bears the potential to derive an optimum use of resources for each individual path inside the network. However, the large number of possibilities makes the planning of networks and provisioning of a service particularly difficult. Different approaches have been suggested for network planning of flex-grid networks in *Multi-objective Design of Survivable Flexible-Grid DWDM Networks*, António Eira, João Santos, Joao Pedro, and João Pires J. OPT. COMMUN. NETW./ VOL. 6, NO. 3/MARCH 2014, pp 326-339, *Fragmentation-*

*Aware Routing and Spectrum Allocation Scheme Based on Distribution of Traffic Bandwidth in Elastic Optical Networks*, Xin Chen, Juhao Li, Paikun Zhu, Ruizhi Tang, Zhangyuan Chen, and Yongqi He, J. OPT. COMMUN. NETW./VOL. 7, NO. 11/NOVEMBER 2015, pp 1064-1074.

However, the task of provisioning a service making optimum use of the degrees of freedom of grid-less optical network remains complex and difficult, and the prior art methods and tools have been found to fail to provide the most favorable solutions in many instances.

SUMMARY OF THE INVENTION

An object underlying the invention is to provide a tool and a method for service provisioning for determining favorable implementations of a service in a grid-less optical network comprising transponders allowing to selectively adjust bandwidths and data rates for individual optical signals.

This problem is solved by a service provisioning tool according to the present invention. Example embodiments are further described in the disclosure below.

The service provisioning tool of the invention allows for determining favorable implementations of a service in a grid-less optical network. In particular, a service provisioning tool in accordance with the invention allows for determining the favorable implementations "online", i.e. during the operation of the network, typically provisioning one service after the other on demand. This is different from so-called "off-line" network planning tools which always work on knowledge of the complete traffic pattern. The optical network comprises transponders allowing for selectively adjusting bandwidths and data rates for individual optical signals. The service provisioning tool is configured to determine a plurality of possible implementations of said service, for each given implementation among said determined possible implementations, assign a total cost value to said given implementation, and select the implementation or a group of implementations having the lowest cost, wherein said total cost values are based on cost values regarding selectable data rates on individual links employed in said implementation, cost values regarding necessity to install additional equipment, in particular a 3R regenerator, for said implementation, and cost values regarding selectable signal frequency bands on individual links employed in said implementation, wherein one or more of said cost values, and in particular the cost values regarding selectable signal frequency bands, are dynamically changing as a function of one or more of the degree of utilization of the respective link, the lifetime of the service, the time available for establishing the service, a modulation format on individual links employed in said implementation, and a signal power employed in said implementation, wherein the cost value per bandwidth varies, under otherwise same conditions, depending on one or more of the size of the selected frequency band, and to what extent the selected frequency band fills gaps between occupied spectral ranges or creates gaps remaining between occupied spectral ranges.

Herein, the phrase 'under otherwise same conditions' indicates that the cost value regarding selectable frequency bands, and hence the cost value per band width, may dynamically change due to other reasons, such as the utilization of the given link or the like. However, in addition to these dynamical change, i.e. under otherwise same conditions, the cost value per band width may vary as indicated above.

A most favorable example implementation is found based on the combination of three cost factors, one related to data rates, one related to the necessity of installing additional equipment, and one related to the bandwidth.

This is different from the prior art referred to above, where a service is established to yield the least equipment cost in a first step, where in a second step it is checked which carrier format for the route works and needs least spectrum—or vice versa ("cost/spectrum comparison"). In other words, the bandwidth is used as optimization factor in order to identify a best fit to the modulation type and its bandwidth requirements for the current traffic demand. Such an approach is more static as that of the invention and based on pre-calculated modulation/bandwidth combinations in a network optimized for predefined system conditions (e.g. end of lifetime fully loaded). However, this does not necessarily lead to the truly most favorable implementation. For example, consider a service request for a 400G client signal between first and second locations. If the routing is done based on equipment costs, the service provisioning tool may find a route without need to install a further 3R regenerator, which works only with 4×100G QPSK. If the routing is done based on spectrum costs, the service provisioning tool may come up with a spectrally more favourable 64QAM route, which however eventually requires the installation of two additional 3R regenerators because the reach of an optical signal decreases with bitrate/number of symbols in the constellation diagram. However, if one combines costs for both aspects at the same time, it may be possible to find what may turn out as the truly most favourable implementation, e.g. 2×200G 8QAM with adding one 3R regenerator. Note that all three routes can theoretically use different optical links i.e. be completely different from each other. Moreover, none of the documents referenced above allows for defining cost for spectrum—the algorithms just optimize the use of the spectrum—which can be in conflict with needs and/or the network topology.

According to the present invention, however, one or more of the cost values, and in particular the cost values regarding selectable signal frequency bands, are dynamically changing as a function of one or more of the degree of utilization of the respective link, the lifetime of the service, the time available for establishing the service, a modulation format on individual links employed in said implementation, and a signal power employed in said implementation. This dynamical change in the cost values proves to be very powerful for making the proper choices in the implementation under an online provisioning of services, where established techniques for off-line provisioning based on a full traffic pattern may not give the desired results.

For example, as the degree of utilization of a given link increases dynamically upon the successive provisioning of services, according to embodiments of the invention the cost values for signal frequency bands on the corresponding link can be dynamically raised, to thereby steer the service provisioning tool towards the use of other links, to avoid a future congestion of the given link.

As another example, the cost values may depend on the lifetime of the service in question. If a service is established only for a limited period of time, for example during the Olympic Games where there is a significant increase in data traffic to and from the hosting city for limited period of time, it would be favorable to dynamically reduce the cost values regarding selectable frequency bands as compared to the cost values for equipment, because it can already be foreseen that occupied frequencies will be released again soon, while installing additional equipment may be unnecessary in view of the fact that the traffic will decrease again once the service is terminated.

As yet another example, the cost values could depend on the time available for establishing the service. Namely, if the service would need to be established very quickly, it could be difficult or even impossible to install additional equipment in the given time, which would be a reason to dynamically raise the costs regarding necessity to install additional equipment with respect to the cost values for data rates or selectable signal frequency bands. Note that this is a typical example for a dynamically varying cost value that is of particular importance in online service provisioning, and that would not be considered in off-line network planning.

Moreover, the service provisioning tool of the invention does not simply assign a uniform cost value per bandwidth to any selected signal frequency band. Instead, the cost value per bandwidth varies depending on the size of the selected frequency band, and/or depending on to what extent the selected frequency band fills gaps between occupied spectral ranges and/or creates gaps remaining between occupied spectral ranges. As will become more apparent from the description below, this way not only the suitability of a given service is evaluated, but also the extent to which the given service will be likely to allow a resource-efficient establishing of future services. Again, this is characteristic for an online service provisioning, where no complete traffic pattern is known, but where the proper decisions have to be made such that future services can be provisioned with a highest possible efficiency of use of resources in the long run.

In a preferred embodiment, the service provisioning tool assigns, under otherwise same conditions, a lower cost value per bandwidth when assigning a frequency band to one or more carriers that is sufficiently large to accommodate at least one further carrier in a possible future implementation, as compared to the cost value per bandwidth for a narrower frequency band that does not permit accommodating a further carrier. This way, the service provisioning tool may select an implementation that allocates more bandwidth than currently necessary, taking the likelihood into account that an additional channel may be introduced to this frequency band at a later stage, thereby making optimal use of the resources in the long run.

In a preferred embodiment, the service provisioning tool assigns, under otherwise same conditions, a lower cost per bandwidth to a frequency band that fills a gap existing between occupied spectral ranges as compared to the cost per bandwidth of a frequency band of the same size that does not fill such gap. This way, the service provisioning tool may be caused to choose an implementation in which a gap existing between occupied spectral ranges is filled, which otherwise may not find use in future services. In other words, this way a fragmentation of the spectrum can be avoided. This is of particular importance, because spectral fragmentation is a particular problem observed by the inventors in grid-less optical networks, that makes the establishment of future services difficult.

In a preferred embodiment, the service provisioning tool assigns, under otherwise same conditions, a higher cost per bandwidth to a frequency band that creates an unusable gap between occupied spectral ranges as compared to the cost per bandwidth of a frequency band of the same size the does not create such unusable gap, wherein an unusable gap is a gap having a spectral width below a predetermined threshold. According to this embodiment, the likelihood of the creation of "unusable gaps" can be reduced, which again serves to avoid a spectral fragmentation in the network. Herein, the term "unusable gap" is a relative term, because whether a certain gap in the spectrum can be used or not will depend on other further parameters than the size of the gap itself but also on other parameters, such as the required data rate, path length and the like. Accordingly, in this embodiment of the invention, the "unusable gap" means a gap having a spectral width below a predetermined threshold applied by the service provisioning tool.

In a preferred embodiment, the total cost value corresponds to a sum of the individual cost values for all links employed in a given implementation. Herein, the sum may be a weighted sum, in which the relative weight of at least two of the cost values regarding data rate, equipment installation and bandwidth are adjustable.

Preferably, the service provisioning tool is further configured to calculate the performance of the implementation. This way, one can be sure that any implementation under consideration does in fact provide the required performance, such as a predetermined optical signal-to-noise ratio (OSNR), residual margin and bit error rate (BER).

In a preferred embodiment, some or all of the cost values are stored in configuration files and are used for routing requests.

In a preferred embodiment, some or all of said cost values, or weighting factors between different types of cost values, are dynamically specified as an input to the routing request.

In a preferred embodiment, the service provisioning tool further comprises a user interface allowing a user to adjust the relative weight between two or more of the cost values regarding data rate, equipment installation and bandwidth. This way, the priorities of the operator, which can change over time, can be easily introduced into the operation of the service provisioning tool. For example, if there should be a high demand for traffic, but only for a limited time, for example during Olympic Games or when other parts of the network are subjected to maintenance, the relative weight of the cost values regarding selectable frequency can be reduced as compared to the cost values regarding necessity to install additional equipment, because a transient exhaustion of the available frequencies is tolerable, knowing that after the event leading to temporarily increased traffic, a good part of the frequencies will be released again. Under these circumstances, it would not be favorable to meet the demands by installing a large amount of additional equipment that will not be necessary anymore after the event is over.

In a preferred embodiment, the tool provides different cost values regarding necessity to install additional equipment based on one or both of the scheduled start of the service and information regarding availability of the equipment. For example, if the service is scheduled to start very soon, but it is known that additional equipment possibly needed would not be available in time, the cost value relating to the necessity to install additional equipment will be raised, because implementations requiring such equipment should be avoided under these circumstances.

SHORT DESCRIPTION OF THE FIGURES

FIG. 1 shows a distribution of carriers allocated and transported in frequency slots having a fixed width of 50

GHz periodically spaced next to each other in a fixed-grid network, together with the passbands of corresponding filters.

DESCRIPTION OF THE PREFERRED EMBODIMENT

For the purposes of promoting an understanding of the principles of the invention, reference will now be made to preferred embodiments illustrated in the drawings, and specific language will be used to describe the same. It will nevertheless be understood that no limitation of the scope of the invention is thereby intended, such alterations and further modifications in the illustrated method and apparatus and such further applications of the principles of the invention as illustrated therein being contemplated as would normally occur now or in the future to one skilled in the art to which the invention relates.

Figure 4:
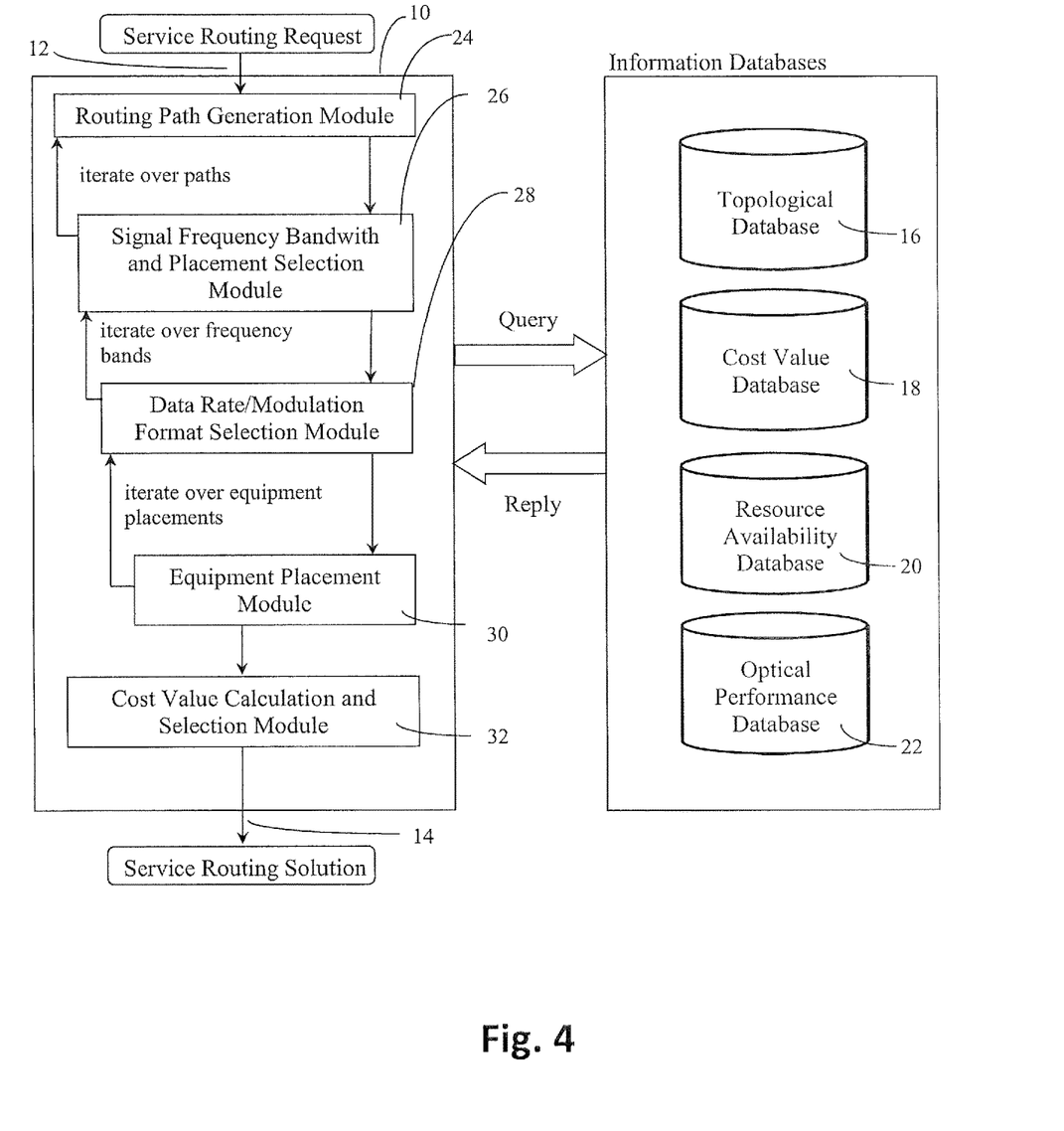
FIG. 4 shows a schematic representation of a routing engine employed by a service provisioning tool according to an embodiment of the invention.

In FIG. 4, a routing engine 10 for use by a service provisioning tool according to an embodiment of the invention is shown. The routing engine 10 has an input interface 12 for receiving a service routing request, and an output interface 14 for outputting a service routing solution. Moreover, the routing engine to is communicatively coupled with various information databases for retrieving information on the network needed in establishing the service routing solution. These database include a topological database 16 containing information about the network topology, a cost value database 18, in which cost values for the links of the network are stored, a resource availability database 20 containing information about the availability of resources, for example which wavelengths are occupied and which wavelengths are free for use on respective links, and an optical performance database 22. The optical performance database 22 includes information allowing to estimate the performance of a given path, such as penalties due to linear and nonlinear distortions, signal OSNR, and signal residual margin at actual and end of life system conditions.

The routing engine to comprises a routing path generation module 24 for determining all possible paths between the start and end nodes of the service. This routing path generation is based on network topology information retrieved from the topology database 16, possibly taking into account a set of routing restrictions specified in the request, and the current resource availability inferred from the resource availability database 20.

The routing engine to further comprises a signal frequency bandwidth and placement selection module 26 which selects, for every path, tentative frequency bands both with regard to the bandwidth and the location of the band in the spectrum. Since the network employed in the present invention is a grid-less network, there is a large freedom to make this choice.

Moreover, the routing engine 10 comprises a data rate/modulation format selection module 28, which suggests tentative data rates and modulation formats to each frequency band suggested by module 26.

The routing engine to further comprises an equipment placement module 30, which for every path established by the routing path generation module 24, selection of width and location of the frequency band and data rate/modulation format, determines possibilities for adding additional equipment, in particular 3R regenerators, that may be necessary to achieve a desired performance with regard to the transmission quality and capacity for said path.

The combination of routing path, equipment placement, selection of width and location of the frequency band, and data rate/modulation format amounts to a possible implementation of the service. For each of the implementations established by the modules 24 to 30, a total cost value is calculated by a cost value calculation and selection module 32, and an implementation or a group of implementations having the lowest cost is and outputted, via the output interface 14 as the service routing solution. For calculating the total cost value, the cost value calculation and selection module 32 retrieves information from the cost value database 18. However, as described above, the information retrieved from the cost value database 18 is generally not stationary, but is, at least in part, dynamically changing, to reflect the current condition of the network that itself is dynamically changing upon provisioning services one after the other online, as will become more apparent with reference to FIG. 5 below.

Figure 5:
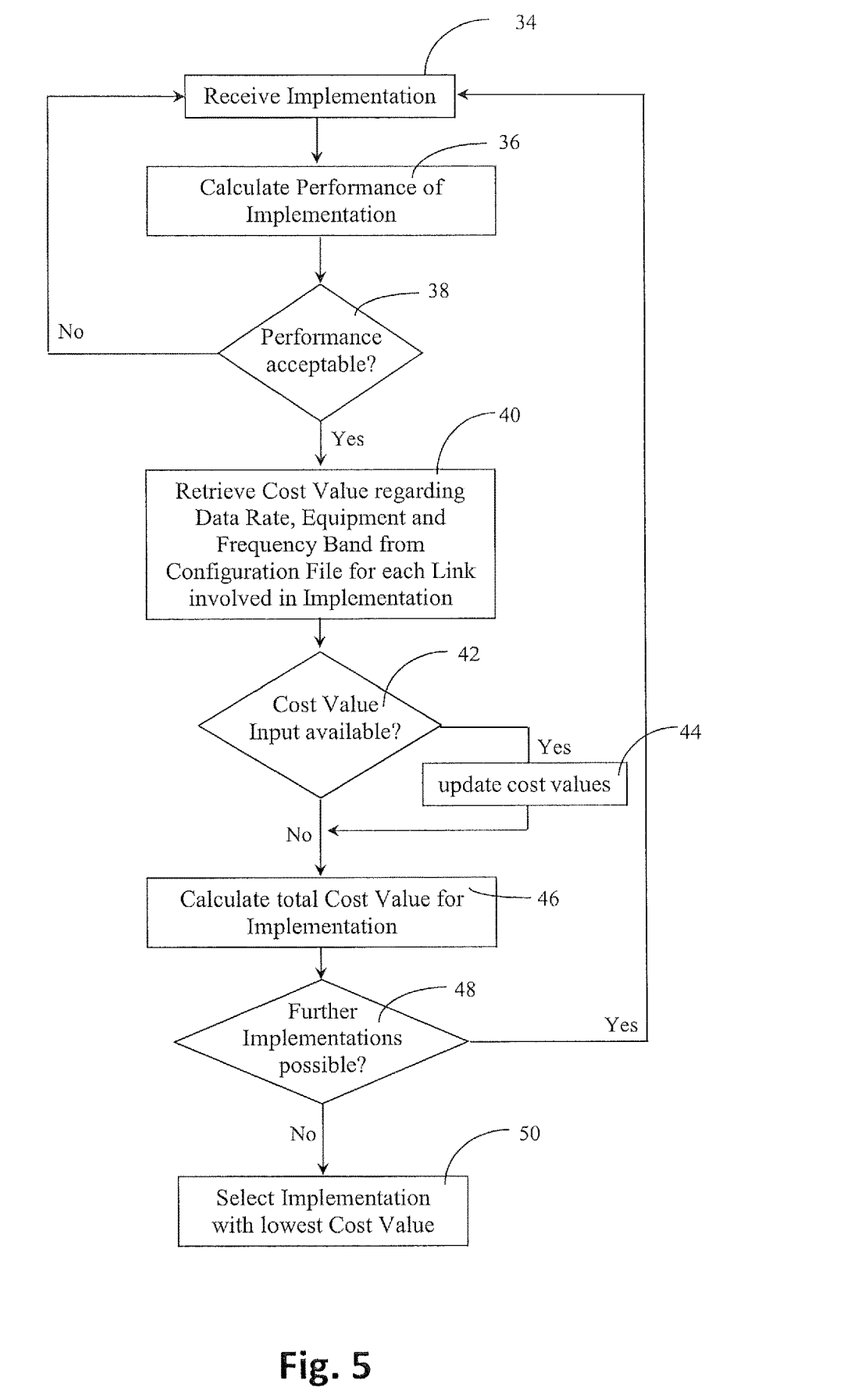
FIG. 5 is a flow diagram showing the operation of the cost value calculation selection module of the routing engine of FIG. 4.

The operation of the cost value calculation and selection module 32 is described in more detail in with reference to the flow diagram shown in FIG. 5. In step 34, the cost value calculation and selection module 32 receives a tentative implementation. In step 36, the module 32 calculates the performance of the implementation and checks, in step 38 whether this performance is acceptable with regard to data transmission quality, possibly depending on the service level agreement specified in the service routing request. The performance can again be estimated based on information retrieved from the optical performance database 22. If the performance is found to be insufficient in step 38, the process returns to step 34 and starts anew with a new implementation. In the alternative, the process proceeds to step 40 in which cost values regarding selectable data rates on individual links employed in the implementation, cost values regarding necessity to install additional equipment, in particular a 3R regenerator, for the implementation, and cost values regarding selectable signal frequency bands on individual links employed in the implementation, are retrieved from a configuration file stored in the cost value database 18.

Note that according to various embodiments of the invention, the cost values stored in the database 18 for each link are dynamically updated such as to reflect the current status of the network, utilization of specific links, current or future demands and the like. For example, even for a given link, one or more of said cost values, and in particular the cost values regarding selectable signal frequency bands, are dynamically changing as a function of one or more of the degree of utilization of the respective link, the lifetime of the service to be provisioned, the time available for establishing the service to be provisioned, a modulation format on individual links employed in said implementation, and a signal power employed in the implementation. This dynamic change can be reflected by dynamically updating the cost values as stored in the database 18. Instead of dynamically updating cost values stored in the database 18, they can also be calculated on the fly based on information retrieved from the cost value database 18, and possibly additional information regarding the status.

Figure 7:
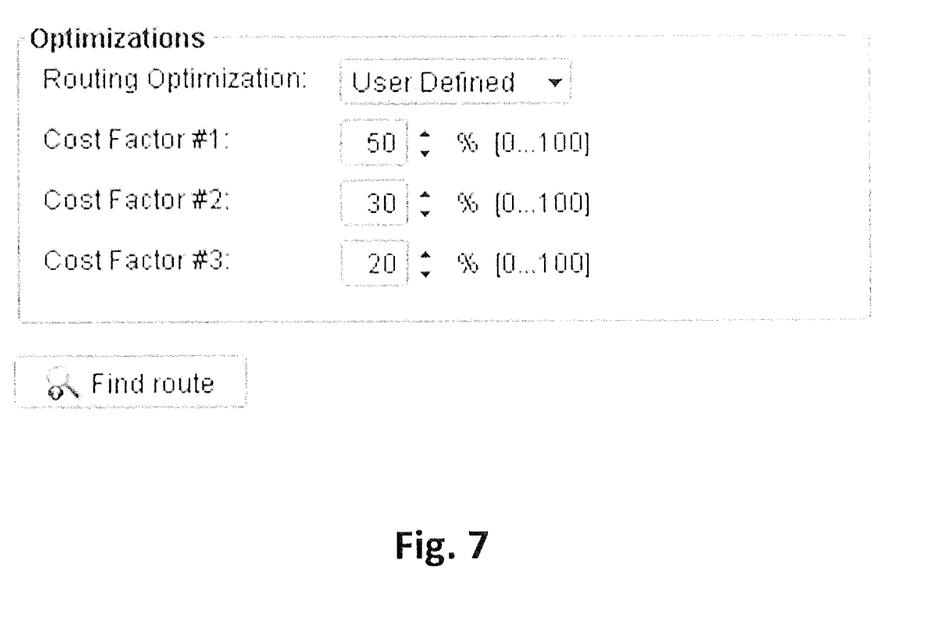
FIG. 7 shows an interface allowing an operator to adjust the relative weight between two or more of the cost values regarding data rate, equipment installation and bandwidth.

In the following step 42, it is checked whether additional cost value input is available. Namely, in addition to the cost values or related information stored in the cost value database 18, in various embodiments of the invention it is also possible to provide further cost value input. Irrespectively of the fact that the cost values or related information stored in the cost value database 18 can in the preferred embodiments be dynamically updated in the way described above, it is possible to provide alternatively or in addition further dynamic cost value information, for example together with the service request. A typical cost value input would be a weighting factor to be applied to the cost values stored in the cost value database 18. A user interface for inputting weighting factors to the three aforementioned types of cost values (data rate, equipment, frequency band) is shown in FIG. 7. If such additional cost value input is available, the cost values are updated in step 44 accounting for such input. For example, the stored cost values can be simply multiplied with the weighting factors provided as cost value input.

In the following step 46, it is checked whether further implementations are possible. If this is the case, the procedure returns to step 34, where the next implementation is received, and the procedure is repeated. If no further implementations are available, in step 50, the implementation or group of implementations with the lowest cost value are selected.

The user or administrator of the system can define and respectively change the cost values stored in the cost value database 18 and employed by the cost value calculation and selection module 32, or change the rules according to which they are dynamically changed. For example, the user or administrator can define cost values for optical spectrum occupation in steps of 125 MHz. Importantly, according to the invention, the costs are not in all cases a linear function of the occupied bandwidth, or in other words, the cost value per bandwidth may vary. In particular, the cost value per bandwidth may vary depending on the size of the selected frequency band, or to what extent the selected frequency band fills gaps between occupied spectral ranges or creates gaps remaining between occupied spectral ranges.

For example, the cost value per bandwidth can be comparatively low (e.g. lower than average) when assigning a frequency band to one or more carriers that is sufficiently large to accommodate at least one further carrier in a possible future implementation. This way, the cost value calculation and selection module 32 may come up with frequency band selections that are larger than needed, but provide good chances that the excessive bandwidth is used at a later time by one or more additional carriers, such that overall, i.e. in the long run, the spectrum is used more efficiently. In some embodiments, particularly low cost value per bandwidth can be assigned to media channel bands, i.e. bands which are meant to accommodate a number of closely packed carriers, and which possibly can be supplemented, with a certain degree of likelihood, by one or more carriers that fit in the same media channel.

Moreover, comparatively low cost values per bandwidth may be assigned to a frequency band that fills a gap existing between occupied spectral ranges. As mentioned before, the fragmentation of the frequency band is one of the most severe problems in flex-grid networks, and if there is a chance to make productive use of a gap, because a certain service request could be implemented using such gap, then the routing engine 10 should be incited to take this opportunity, even though the gap could for example be a little wider than necessary.

In this situation, in a method based on constant cost value per bandwidth, the gap would not have been used, because a slightly smaller frequency band in a free part of the spectrum would have appeared to be more favorable, thereby possibly missing a good chance, may be the only chance to make productive use of the gap. By assigning lower cost values per bandwidth to such gaps, the filling of gaps is rewarded. For example, the cost value per bandwidth may be only 50% if the required bandwidth just uses a gap in the spectrum. Assuming that normally 75 GHz would have the cost 1.5 for an optical multiplex section (OMS), if there is just a gap available with 75 GHz, the cost is only 0.75.

Moreover, there may be cases where a chosen bandwidth leads to a gap that is so small that it is questionable that it can be productively used in the future. This situation may occur if there is initially a comparatively large range between occupied frequencies, but by allocating a new band within this range, the remainder of this range is so small that the probability that any future service request can make productive use of it is likewise small. To avoid such situations, if a gap that would be created by allocating a certain frequency band falls below a predetermined threshold (for example 35 or 25 GHz), indicating that the use of the gap so created can most likely not be used in future services, the cost value of the frequency band that would lead to such "unusable gap" is increased. This could for example have the consequence that a frequency band at some other place in the spectrum is chosen, or that the entire range is chosen, although wider than necessary, giving the justified expectation that the excessive bandwidth can be used productively at a later stage by adding one or more carriers to this range, possibly in the form of a media channel.

All cost factors (optionally after some weighting) may be mapped onto a directed graph model of the network, which is used by the routing path generation module 24 to calculate routes for the services to be provisioned. Note that the total cost value for a link in the network can be the sum, and more generally the weighted sum of the individual cost values associated with this link.

To calculate the path, Dijkstra's algorithm for simple routes or Surballe's algorithm for calculating a pair of edge- and vertex-disjoint paths in a graph for protected services, can be used (known as shortest path algorithm). The routing engine to will use the algorithm to find the best path by using the cost attributes as the optimum between the vertices.

Figure 6:
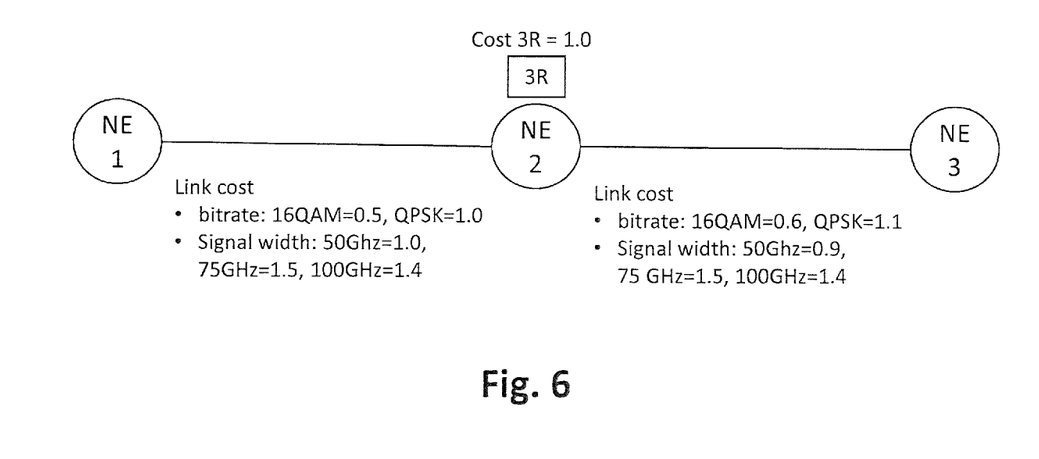
FIG. 6 schematically illustrates a simple path comprising three nodes and a summary of cost values associated with the intermediate links.

The cost values can be different for new and already existing configurations, and they may also be changed over time In FIG. 6, a very simple example of a network with only three network elements (NEs) is shown. For this network, the customer may define in the provisioning/planning system cost values for R adding 3R regenerators, the cost for bitrate and the cost for optical bandwidth per link. Note that for simplicity, only these cost factors are shown, but of course, more (already known) cost factors can and will typically be considered.

Moreover, the cost value for the signal bandwidth depends also on the number of carriers that can be transmitted in a frequency band or frequency slot FS, assuming that the same frequency slot can be reused for a second service between same add/drop nodes.

Let it be assumed that the user wants to create a 100G demand in the network. Based on the defined cost values and weighting factor, the provisioning system's routing engine to calculates the overall cost of the possibilities to configure the demand, defines the sequence based on the end to end cost and checks the optical performance for the different options listed below, where "+3R" indicates that one 3R regenerator needs to be provided at the intermediate network element and "e2e" stands for "end-to-end":

1. 200G 16QAM in 500 GHz FS e2e: overall cost: 3.0
2. 200G 16 QAM in too GHz FS e2e: overall cost: 3.9
3. 200G 16QAM in 50 GHz FS+3R: overall cost: 4.0
4. 100G QPSK in 500 GHz FS e2e: overall cost: 4.0
5. 200G 16QAM in 62.5 GHz FS e2e: overall cost: 4.1
6. 200G 16 QAM in 100 GHz FS+3R: overall cost: 4.9
7. 100G QPSK in too GHz FS e2e: overall cost: 5.0
8. 100G QPSK in 50 GHz FS+3R: overall cost: 5.0
9. 200G 16QAM in 62.5 GHz FS+3R: overall cost: 5.1
10. 100G QPSK in 62.5 GHz FS e2e: overall cost: 5.2
11. 100G QPSK in 100 GHz FS+3R: overall cost: 6.0
12. 100G QPSK in 62.5 GHz FS+3R: overall cost: 6.3

Herein, the assumed optical performance for 200G 16QAM (third variant listed above) is not sufficient unless a 3R regenerator is provided at the intermediate network element. The routing engine to would hence propose to the user in this example either to configure a. 200G 16QAM in 50 GHz FS+3R (overall cost: 4.0) or
b. 100G QPSK in 500 GHz FS (no 3R, overall cost: 4.0).

If the service needs to be configured automatically, i.e. without user intervention, additional rules can be considered, e.g. bitrate has priority over bandwidth or the like. Additional route properties and requirements can be evaluated automatically during routing. For example, a shortest route might be discarded, if it exceeds the maximum allowed signal latency.

In case 200G 16QAM in 500 GHz FS+3R is configured (option a), the second 100G demand between the same add/drop nodes and structures can be configured "for free". In other words, the cost factor for the optical bandwidth (cost value per bandwidth) will change dynamically in dependence on pre-configured connections and the network utilization.

Let it be assumed that the user wants to create another 100G demand in the network between the same network elements. In case a frequency slot is configured for the first demand which allows to be used for a second demand (option a), the bandwidth cost need not to be considered for the second demand. In the example shown above this means that the cost for e.g. 100G QPSK in too GHz FS e2e which is already available is 2.1.

The service provisioning tool and method of the invention has a number of important advantages:

It allows for obtaining the lowest cost per bit and the flexible adaptation to the customers' business model, e.g. own vs rented fiber, available fiber capacity, additional equipment vs new cabling.

After a user has defined the cost values, the provisioning system can do the rest and identify lowest cost per bit. The user himself, however, does not have to take care about supported different bitrates and the complexity of grid-less optical networks. Instead, the user just needs to enter the demand.

By choosing the cost values, the user can optimize cost for service provisioning according the customer's specific business model (operational process, available fiber capacity, country specific laws and rules, cost and possibility to supply new fibers, . . . )

The cost values can be changed dynamically in dependence on service requirements.

The modulation type and number of carriers best fitting to the capacity of the service to be provisioned can be determined.

The frequency slot bandwidth best fitting to the modulation type and number of filters in the optical path can be determined.

The spectral location from available bandwidth in the C-band best fitting to the bandwidth of the frequency slot can be selected.

The invention allows weighting spectrum cost versus equipment costs.

Note that with higher order of the modulation type, higher spectral efficiency can be achieved (lower costs per bit). However, higher order modulation types are less tolerant to the optical filtering effects in the path. In this case, a multi-carrier frequency slot (super-channel) may be of higher benefit. Using the provisioning tool and method of the invention allows for early bandwidth reservation by considering future evolution of the traffic demands even at higher equipment costs for the single carrier used in the first step. In other words, unlike the state of the art optimization algorithm, a solution leading to higher equipment costs and larger bandwidth usage at the time of first service provisioning can be identified as beneficial for the future network evolution.

Although preferred exemplary embodiments are shown and specified in detail in the drawings and the preceding specification, these should be viewed as purely exemplary and not as limiting the invention. It is noted in this regard that only the preferred exemplary embodiments are shown and specified, and all variations and modifications should be protected that presently or in the future lie within the scope of protection of the invention as defined in the appended claims.

The invention claimed is:

1. A service provisioning tool for provisioning a service in a grid-less optical network, the optical network comprising transponders that enable selective adjustment of bandwidths and data rates for individual optical signals, the service provisioning tool being configured to:

determine a plurality of possible implementations of the service, for each implementation among the determined plurality of possible implementations, assign a respective total cost value to the implementation, select at least one implementation, from among the determined plurality of possible implementations, having a lowest total cost value among the assigned total cost values, and provision the service in the optical network according to the at least one implementation selected in the select step, wherein the respective total cost value for a given implementation among the determined plurality of possible implementations is based at least in part on:

a first cost value regarding at least one selectable data rate on at least one individual link employed in the given implementation, and a second cost value regarding a necessity to install additional equipment for the given implementation, and a third cost value regarding at least one selectable signal frequency band on at least one individual link employed in the given implementation, wherein for at least one implementation among the determined plurality of possible implementations, the third cost value depends at least in part on at least one of:

a degree of utilization of the respective at least one individual link employed in the respective implementation, a lifetime of the service, a time available for establishing the service, a modulation format on the respective at least one individual link employed in the respective implementation, and a signal power employed in the respective implementation, wherein a cost value per band width, in relation to the third cost value, has a value that, at least under otherwise same conditions, is one of at least two different values, wherein which one of the at least two different values the cost value per bandwidth has depends at least in part on at least one of:

whether the respective at least one selectable signal frequency band, if selected, fills a gap between occupied spectral ranges, an extent to which the respective at least one selectable signal frequency band, if selected, fills a gap between occupied spectral ranges, whether the respective at least one selectable signal frequency band, if selected, does not fill a gap between occupied spectral ranges, an extent to which the respective at least one selectable signal frequency band, if selected, does not fill a gap between occupied spectral ranges, whether the respective at least one selectable signal frequency band, if selected, creates a gap between occupied spectral ranges, whether the respective at least one selectable signal frequency band, if selected, creates an unusable gap between occupied spectral ranges, whether the respective at least one selectable signal frequency band, if selected, has, in addition to a bandwidth for the service, a bandwidth to accommodate at least another carrier in an implementation that is not among the determined plurality of possible implementations.

2. The service provisioning tool of claim 1, wherein a first value among the at least two different values is a lower value than a second value among the at least two different values, and wherein the cost value per bandwidth has:

the first value when the respective at least one selectable signal frequency band, if selected, has the bandwidth to accommodate the at least another carrier, the second value when the respective at least one selectable signal frequency band, if selected, does not have the bandwidth to accommodate the at least another carrier.

3. The service provisioning tool of claim 1, wherein a first value among the at least two different values is a lower value than a second value among the at least two different values, and wherein the cost value per bandwidth has:

the first value when the respective at least one selectable signal frequency band, if selected, fills the gap between occupied spectral ranges, the second value when the respective at least one selectable signal frequency band, if selected, does not fill the gap between occupied spectral ranges.

4. The service provisioning tool of claim 1, wherein a first value among the at least two different values is a higher value than a second value among the at least two different values, and wherein the cost value per bandwidth has:

the first value when the respective at least one selectable signal frequency band, if selected, creates between occupied spectral ranges a gap having a spectral width below a predetermined threshold, the second value when the respective at least one selectable signal frequency band, if selected, does not create between occupied spectral ranges a gap having a spectral width below a predetermined threshold.

5. The service provisioning tool of claim 1, wherein the selecting step is performed in an online manner, and wherein the respective total cost value for the given implementation among the determined plurality of possible implementations corresponds to a sum of the first cost value, the second cost value, and the third cost value.

6. The service provisioning tool of claim 5, wherein the sum is a weighted sum, in which a relative weight of at least two of the first cost value, the second cost value, and the third cost value, are adjustable.

7. The service provisioning tool of claim 1, wherein the service provisioning tool is further configured to calculate a performance of the implementation.

8. The service provisioning tool of claim 1, wherein the service provisioning tool is further configured to:

store in at least one configuration file and use for routing requests at least one of:

the first cost value, the second cost value, the third cost value, a weighting factor relating to at least two of the first cost value, the second cost value, and the third cost value, dynamically update at least one of the at least one configuration file to update at least one of the stored at least one of the first cost value, the second cost value, the third cost value, and the weighting factor.

9. The service provisioning tool of claim 1, wherein the service provisioning tool is further configured to dynamically specify as an input to a routing request at least one of the first cost value, the second cost value, and the third cost value.

10. The service provisioning tool of claim 1, further comprising a user interface configured to enable a user to adjust a relative weight between at least two of the first cost value, the second cost value, and the third cost value.

11. The service provisioning tool of claim 1, wherein the second cost value has a value that is one of at least two different values, wherein which one of the at least two different values the second cost value has depends at least in part on at least one of a scheduled start of the service and information regarding availability of the additional equipment.

12. A method for provisioning a service in a grid-less optical network, the optical network comprising transponders that enable selective adjustment of bandwidths and data rates for individual optical signals, the method comprising the steps of:

determining a plurality of possible implementations of the service, for each implementation among the determined plurality of possible implementations, assigning a respective total cost value to the implementation, and selecting the at least one implementation, from among the determined plurality of possible implementations, having a lowest total cost value among the assigned total cost values, provisioning the service in the optical network according to the at least one implementation selected in the selecting step, and wherein the respective total cost value for a given implementation among the determined plurality of possible implementations is based at least in part on:
  a first cost value regarding at least one selectable data rate on at least one individual link employed in the given implementation, and
  a second cost value regarding a necessity to install additional equipment for the given implementation, and
  a third cost value regarding at least one selectable signal frequency band on at least one individual link employed in the given implementation, wherein for at least one implementation among the determined plurality of possible implementations, the third cost value depends at least in part on at least one of:
  a degree of utilization of the respective at least one individual link employed in the respective implementation,
  a lifetime of the service,
  a time available for establishing the service,
  a modulation format on the respective at least one individual link employed in the respective implementation, and
  a signal power employed in the respective implementation, wherein a cost value per band width, in relation to the third cost value, has a value that, at least under otherwise same conditions, is one of at least two different values, wherein which one of the at least two different values the cost value per bandwidth has depends at least in part on at least one of:
  whether the respective at least one selectable signal frequency band, if selected, fills a gap between occupied spectral ranges,
  an extent to which the respective at least one selectable signal frequency band, if selected, fills a gap between occupied spectral ranges,
  whether the respective at least one selectable signal frequency band, if selected, does not fill a gap between occupied spectral ranges,
  an extent to which the respective at least one selectable signal frequency band, if selected, does not fill a gap between occupied spectral ranges,
  whether the respective at least one selectable signal frequency band, if selected, creates a gap between occupied spectral ranges,
  whether the respective at least one selectable signal frequency band, if selected, creates an unusable gap between occupied spectral ranges,
  whether the respective at least one selectable signal frequency band, if selected, has, in addition to a bandwidth for the service, a bandwidth to accommodate at least another carrier in an implementation that is not among the determined plurality of possible implementations.

13. The method of claim 12, wherein a first value among the at least two different values is a lower value than a second value among the at least two different values, and wherein the cost value per bandwidth has:
  the first value when the respective at least one selectable signal frequency band, if selected, has the bandwidth to accommodate the at least another carrier,
  the second value when the respective at least one selectable signal frequency band, if selected, does not have the bandwidth to accommodate the at least another carrier.

14. The method of claim 12, wherein a first value among the at least two different values is a lower value than a second value among the at least two different values, and wherein the cost value per bandwidth has:
  the first value when the respective at least one selectable signal frequency band, if selected, fills the gap between occupied spectral ranges,
  the second value when the respective at least one selectable signal frequency band, if selected, does not fill the gap between occupied spectral ranges.

15. The method of claim 12, wherein a first value among the at least two different values is a higher value than a second value among the at least two different values, and wherein the cost value per bandwidth has:
  the first value when the respective at least one selectable signal frequency band, if selected, creates between occupied spectral ranges a gap having a spectral width below a predetermined threshold,
  the second value when the respective at least one selectable signal frequency band, if selected, does not create between occupied spectral ranges a gap having a spectral width below a predetermined threshold.

16. The method of claim 12, wherein the selecting step is performed in an online manner, and wherein the respective total cost value for the given implementation among the determined plurality of possible implementations corresponds to a sum of the first cost value, the second cost value, and the third cost value.

17. The method of claim 16, wherein the sum is a weighted sum, in which a relative weight of at least two of the first cost value, the second cost value, and the third cost value, are adjustable.

18. The method of claim 12, further comprising a step of calculating a performance of the implementation.

19. The method of claim 12, further comprising the steps of:
  storing in at least one configuration file and use for routing requests at least one of:
    the first cost value,
    the second cost value,
    the third cost value,
    a weighting factor relating to at least two of the first cost value, the second cost value, and the third cost value,
  dynamically updating at least one of the at least one configuration file to update at least one of the stored at least one of the first cost value, the second cost value, the third cost value, and the weighting factor.

20. The method of claim 12, wherein the service provisioning tool is further configured to dynamically specify as an input to a routing request at least one of the first cost value, the second cost value, and the third cost value.

21. The method of claim 12, further comprising the steps of:
  receiving input from a user interface, and adjusting, in response to the input, a relative weight between at least two of the first cost value, the second cost value, and the third cost value.

22. The method of claim 12, wherein the the second cost value has a value that is one of at least two different values, wherein which one of the at least two different values the second cost value has depends at least in part on at least one of a scheduled start of the service and information regarding availability of the additional equipment.

* * * * *